United States Patent
Satou

(10) Patent No.: US 10,535,204 B2
(45) Date of Patent: Jan. 14, 2020

(54) SENSOR INTERFACE DEVICE, MEASUREMENT INFORMATION COMMUNICATION SYSTEM, MEASUREMENT INFORMATION COMMUNICATION METHOD, AND NON-TRANSITORY COMPUTER READABLE MEDIUM

(71) Applicant: FANUC CORPORATION, Yamanashi (JP)

(72) Inventor: Kazuhiro Satou, Yamanashi (JP)

(73) Assignee: FANUC CORPORATION, Yamanashi (JP)

(*) Notice: Subject to any disclaimer, the term of this patent is extended or adjusted under 35 U.S.C. 154(b) by 0 days.

(21) Appl. No.: 15/801,547

(22) Filed: Nov. 2, 2017

(65) Prior Publication Data
US 2018/0137691 A1    May 17, 2018

(30) Foreign Application Priority Data
Nov. 11, 2016  (JP) .................. 2016-220749

(51) Int. Cl.
*G07C 3/14*       (2006.01)
*G06N 20/00*      (2019.01)
(Continued)

(52) U.S. Cl.
CPC .............. *G07C 3/14* (2013.01); *G06F 13/38* (2013.01); *G06F 17/40* (2013.01); *G06N 20/00* (2019.01)

(58) Field of Classification Search
CPC . G07C 3/14; G06F 13/38; G06F 15/18; G06F 17/40; G05B 13/027
See application file for complete search history.

(56) References Cited

U.S. PATENT DOCUMENTS 5,832,468 A * 11/1998 Miller .................. G05B 13/027
                                                         706/23
6,192,352 B1 *  2/2001 Alouani ............... G05B 13/027
                                                         706/2
(Continued)

FOREIGN PATENT DOCUMENTS

CN       101546194       9/2009
CN       103998714       8/2014
(Continued)

OTHER PUBLICATIONS

Office Action issued in the Chinese Patent Application No. 201711078469.7 dated Jan. 14, 2019.

*Primary Examiner* — Michael Jung
(74) *Attorney, Agent, or Firm* — Wenderoth, Lind & Ponack, L.L.P.

(57) ABSTRACT

In a case of sending characteristic data representing a characteristic of measurement data, rather than the measurement data itself from a sensor, characteristic data suited to the connected sensor is sent. A sensor interface device (100) which is connected in a communication path between a measurement means (200) and a higher-order device (300), includes: a data acquisition means (110) for acquiring measurement data, which is data based on a physical quantity measured by the measurement means (200); a storage means (1.20) for storing the measurement data thus acquired; a learning means (130) for performing machine learning with a measurement data group stored by the storage means (120) as an input, thereby performing extraction of characteristic data, which is data representing a characteristic of the measurement data group; and a communication means (140) for sending the characteristic data extracted by the learning means (130) to the higher-order device (300).

12 Claims, 9 Drawing Sheets

(51) Int. Cl.
*G06F 13/38* (2006.01)
*G06F 17/40* (2006.01)

(56) References Cited

U.S. PATENT DOCUMENTS

| | | | | |
|---|---|---|---|---|
| 7,308,322 | B1* | 12/2007 | Discenzo | G05B 23/0221 |
| | | | | 700/175 |
| 8,301,406 | B2* | 10/2012 | Lee | G05B 23/0254 |
| | | | | 702/77 |
| 9,460,732 | B2* | 10/2016 | Wingate | G10L 21/0272 |
| 2007/0250461 | A1* | 10/2007 | Sabe | G06F 15/18 |
| | | | | 706/12 |
| 2007/0299910 | A1* | 12/2007 | Fontenot | G16H 10/20 |
| | | | | 709/204 |
| 2012/0296471 | A1* | 11/2012 | Inaba | B25J 9/163 |
| | | | | 700/253 |
| 2014/0129560 | A1* | 5/2014 | Grokop | G06N 5/043 |
| | | | | 707/737 |
| 2014/0351183 | A1* | 11/2014 | Germain | G06F 17/5009 |
| | | | | 706/12 |
| 2016/0279794 | A1* | 9/2016 | Inagaki | B25J 9/1674 |
| 2018/0038954 | A1* | 2/2018 | Deshpande | G08B 13/1636 |
| 2018/0234318 | A1* | 8/2018 | Cox | H04L 43/0882 |

FOREIGN PATENT DOCUMENTS

| | | |
|---|---|---|
| CN | 104054284 | 9/2014 |
| JP | 57-10770 | 1/1982 |
| JP | 2009-169888 | 7/2009 |
| JP | 2009-282750 | 12/2009 |
| JP | 2010-213782 | 9/2010 |
| JP | 2018-5511 | 1/2018 |

* cited by examiner

SENSOR INTERFACE DEVICE, MEASUREMENT INFORMATION COMMUNICATION SYSTEM, MEASUREMENT INFORMATION COMMUNICATION METHOD, AND NON-TRANSITORY COMPUTER READABLE MEDIUM This application is based on and claims the benefit of priority from Japanese Patent Application No. 2016-220749, filed on 11 Nov. 2016, the content of which is incorporated herein by reference.

BACKGROUND OF THE INVENTION

Field of the Invention

The present invention has an object of providing a sensor interface device, measurement information communication system, measurement information communication method, and non-transitory computer readable medium for transmitting information measured by sensors, etc.

Related Art

The matter of measuring vibrations, etc. of a machine tool by sensors, and using the measured information in a higher-order device is commonly carried out. In this case, it is necessary to send the information measured with sensors to the higher-order device via a network.

In this point, in recent years, the number of sensors has been increasing accompanying the spread of the internet of things (IoT). In addition, the acquisition needs related to sensor data of high-frequency are rising, as in failure prediction using AE (Acoustic Emission). For these reasons, it is predicted that the sensor data flowing on the network will increase in an FA (Factory Automation) environment, etc., and compress communication band.

Moreover, in the case of aiming to make some kind of determination, obtain knowledge, or the like from the sensor data (for example, making a failure prediction, or the like) rather than using sensor data in control, it is often better to obtain only characteristic quantities having higher abstraction level, with the data itself measured with sensors (i.e. raw data) being unnecessary.

Taking account of this point, Patent Document 1 describes technology that transmits not the data itself measured with sensors, but rather metadata generated based on this data measured with sensors. More specifically, a sensor node described in Patent Document 1 includes a sensor measuring a physical quantity, a data acquisition part that samples the physical quantity measured by the sensor at a predetermined frequency to generate measurement data, a control part that performs processing on the measurement data generated by the data acquisition part, and a radio communication part that sends data based on commands of the control unit. In such a configuration, the control unit generates metadata formed by extracting a summary of the measurement data. Then, the generated metadata is sent by the radio communication part.

With the configuration described in Patent Document 1, it is in this way possible to reduce the sent data volume, and ensure the communication band on the network, by sending metadata formed by extracting a summary, rather than the data itself measured with sensors.

Patent Document 1:
Japanese Unexamined Patent Application, Publication No. 2009-169888

SUMMARY OF THE INVENTION

However, there have been the following such problems with the aforementioned technology described in Patent Document 1.

The technology described in Patent Document 1 is using a hard-coded calculation method in the calculation of characteristic data (metadata) representing the characteristics of the measurement data. In this regard, the unique characteristic data is considered to differ depending on the type of sensor. For this reason, it is desirable to vary the calculation method of characteristic data to suit the type of sensor. Most of all, with Patent Document 1, processing of a sensor node in which the sensor, control part, communication part, etc, are integrated is considered as a premise. In other words, it is decided in advance for what kinds of sensors to calculate the characteristic data. In such a case, a problem does not arise even if hard-coding a method of calculating characteristic data in advance.

However, with a sensor interface device made by considering to universally connect to various types of sensors, a problem arises in not being able to handle by a hard-coded method of calculating characteristic data. This is because, without knowing what kinds of sensors are connected to this sensor interface device, it is considered that the hard-coded calculation method may not the appropriate method depending on the connected sensors.

On the other hand, with a method that sends the data itself measured by sensors without extracting characteristic data, the problem arises in that the communication band is compressed as stated at the beginning.

Therefore, the present invention has an object of providing a sensor interface device, measurement information communication system, measurement information communication method, and measurement information communication program which are capable of sending characteristic data suited to the connected sensors, in the case of sending not. the measurement data itself from sensors, but rather characteristic data representing the characteristics of the measurement data.

According to a first aspect of the present invention, a sensor interface device (e.g., the sensor interface device 100 described later) includes: a data acquisition means (e.g., the data acquisition unit 110 described later) for acquiring measurement data, which is data based on a physical quantity measured by a measurement means (e.g., the sensor 200 described later; a storage means (e.g., the storage unit 120 described later) for storing the measurement data thus acquired; a learning means (e.g., the learning unit 130 described later) for performing machine learning with a measurement data group stored by the storage means as an input, thereby extracting of characteristic data, which is data representing a characteristic of the measurement data group; and a communication means (e.g., the communication unit 140 described later) for sending the characteristic data extracted by the learning means to a higher-order device (e.g., the higher-order device 300 described later), in which the sensor interface device is connected in a communication path between the measurement means and the higher-order device.

According to a second aspect of the present invention, the sensor interface device as described in the first aspect may be configured so that, when defining a communication path between the sensor interface device and the measurement means as a first communication path, and defining a communication path between the sensor interface device and the higher-order device as a second communication path, the communication means sends the characteristic data via the second communication path to the higher-order device at a slower cycle than a cycle at which the data acquisition means acquires the measurement data via the first communication path.

According to a third aspect of the present invention, the sensor interface device as described in the first or second aspect may be configured so that the learning means constructs a learning model by repeatedly performing the machine learning while varying the measurement data group inputted, and performs extraction of the characteristic data from a new measurement data group using the learning model thus constructed.

According to a fourth aspect of the present invention, the sensor interface device as described in any one of the first to third aspects may be configured to further include a timing generation means (e.g., the timing generation unit 140 described later) for generating an internal timing signal, by multiplying an external timing signal periodically received from the higher-order device, in which the data acquisition means acquires the measurement data at a timing based on the internal timing signal.

According to a fifth aspect of the present invention, the sensor interface device as described in any one of the first to fourth aspects may be configured to include a plurality of the data acquisition means, in which each of the plurality of the data acquisition means acquires measurement data based on a physical quantity measured by respectively different measurement means.

According to a sixth aspect of the present invention, the sensor interface device as described in any one of the first to fifth aspects may be configured so that the data acquisition means includes one analog-digital conversion circuit. (e.g., the A/D converter 170 described later) for acquiring the measurement data by sampling an analog signal representing a physical quantity measured by the measurement means, and the data acquisition means acquires the measurement data using the one analog-digital conversion circuit by time sharing for each analog signal representing a physical quantity measured by a plurality of the measurement means.

According to a seventh aspect of the present invention, the sensor interface device as described in any one of the first to sixth aspects may be configured to further include a frequency analysis means (e.g., the frequency analysis unit 180 described later) for performing Fourier transformation on a measurement data group stored by the storage means, in which the learning means performs machine learning with the measurement data group subjected to Fourier transformation by the frequency analysis means as an input, thereby performing extraction of the characteristic data.

According to an eighth aspect of the present invention, the sensor interface device as described in any one of the first to seventh aspects may be configured so as to utilize an. autoencoder (e.g., the learning unit (autoencoder) 40 described later) in extraction of the characteristic data of the learning means.

According to a ninth aspect of the present invention, a measurement information communication system (e.g., the measurement information communication system 1000 described later) including the sensor interface device as described in any one of the first to eighth aspects, and the higher-order device, in which the physical quantity measured by the measurement means is a physical quantity related to a measurement target device, and the higher-order device performs prediction related to occurrence of malfunction or failure of the measurement target device based on the characteristic data.

According to a tenth aspect of the present invention, a measurement information. communication method to be performed. by a computer (e.g., the sensor interface device 100 described later) connected in a communication path between a measurement means (e.g., the sensor 200 described later) and a higher-order device (e.g., the higher-order device 300 described later), includes the steps of: acquiring measurement data which is data based on a physical quantity measured by the measurement means; storing the measurement data thus acquired; performing machine learning with a measurement data group stored in the step of storing as an input, thereby performing extraction of characteristic data, which is data representing a characteristic of the measurement data group; and sending the characteristic data extracted in the step of machine learning to the higher-order device.

According to an eleventh aspect of the present invention, a measurement information communication program enables a computer connected in a communication path between a measurement means (e.g., the sensor 200 described later) and a higher-order device (e.g., the higher-order device 300 described later) to function as a sensor interface device (e.g., the sensor interface device 100 described later), in which. the sensor interface device includes: a data acquisition means (e.g., the data acquisition unit 110 described later) for acquiring measurement data, which is data based on a physical quantity measured by a measurement means (e.g., the sensor 200 described later); a storage means (e.g., the storage unit 120 described later) for storing the measurement data thus acquired; a learning means (e.g., the learning unit 130 described later) for performing machine learning with a measurement data group stored by the storage means as an input, thereby extracting of characteristic data, which is data representing a characteristic of the measurement data group; and a communication means (e.g., the communication unit 140 described later) for sending the characteristic data extracted by the learning means to the higher-order device.

According to the present invention, it becomes possible to send not measurement data. itself from sensors, but rather characteristic data suited to the connected sensors, in the case of sending characteristic data representing characteristics of the measurement data.

DETAILED DESCRIPTION OF THE INVENTION

Next, embodiments of the present invention will be explained in detail by referencing the drawings. Hereinafter, explanations will be made for five embodiments. Prior to the explanations of these five embodiments, the overall configuration of a measurement information communication system sensor interface device 1000 serving as a premise for each embodiment will be explained first by referencing FIG. 1.

Figure 1:
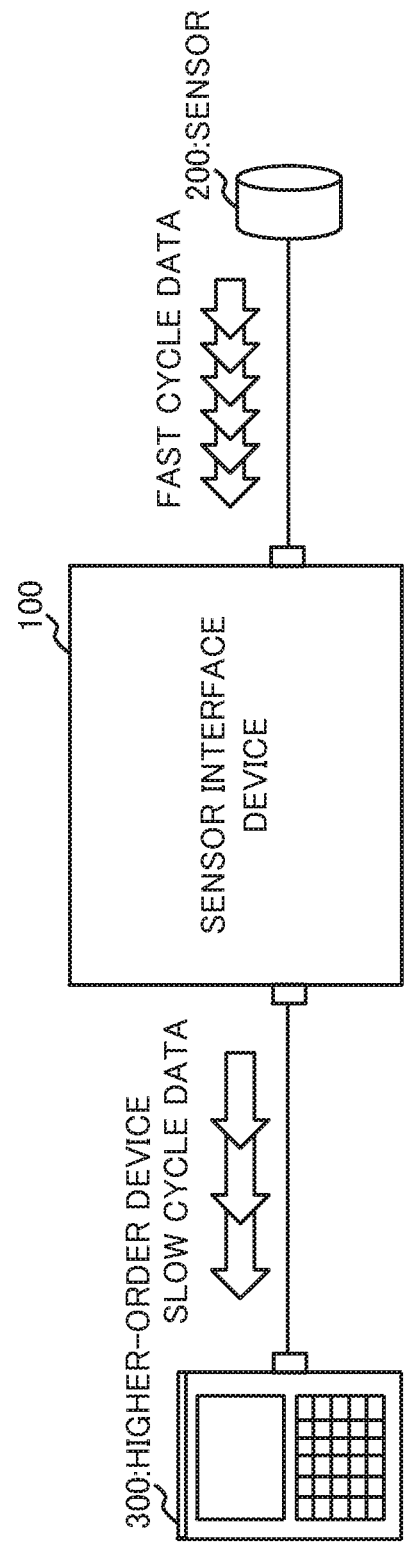
FIG. 1 is a block diagram representing a configuration serving as the premise of each embodiment of the present invention.

As shown in FIG. 1, the measurement information communication system sensor interface device 1000 includes a sensor interface device 100, sensors 200, and higher-order device 300. The sensor 200 are various sensors, and measure physical quantities related to a device, etc. (not illustrated) serving as a measurement target. Then, the sensor 200 outputs an analog signal representing the measured physical quantity to the sensor interface device 100.

In more detail, the device, etc. serving as the measurement target is a machine tool installed in a factory, a numerical control device (CNC: Computer Numerical Controller) that controls this machine tool, or an industrial robot. Then, one or a plurality of the sensors 200 are installed to these measurement targets. For example, two to three are installed for one bearing of a machine tool.

The sensor 200 is an acceleration sensor for measuring the vibration occurring in the machine tool upon the machine tool processing a work, vibration imparted on the numerical control device by this vibration propagating, or vibration occurring in an industrial robot upon the industrial robot being driven, for example. In this case, the acceleration sensor may be a sensor measuring a single axis, or may be a three-axis acceleration sensor capable of measuring acceleration in the three-axes of an X-axis, Y-axis and Z-axis, which are respectively orthogonal to each other.

In addition, the sensor 200 may be an AE sensor. AE sensor is a sensor that captures AE waves, which are vibrations in the ultrasonic band emanating upon the measurement target deforming or being destroyed. For example, in the case of a crack occurring at the inside, etc. of a device such as a machine tool, a change will occur in the frequency component of several 100 kHz to several MHz accompanying this. According to an AE sensor, it is possible to detect the event of a crack occurring prior to malfunction or failure of the device manifesting, by monitoring for such a change in frequency component.

Herein, generally, the acceleration sensor detects vibrations with a frequency component of several tens of kHz, for example. In this regard, the AE sensor detects AE waves with a frequency component of several 100 kHz to several MHz, for example. Since which sensor is suited to measurement varies according to the measurement target and cause of damage, for example, it may be configured so as to perform both of measurement by an acceleration sensor and measurement by an AE sensor on one measurement target.

The vibrations and AE waves measured by the sensors 200 which are an acceleration sensor and an AE sensor are outputted to the sensor interface device 100 as analog vibration waveform signals representing this vibration and AE wave.

Furthermore, as another example, the sensor 200 may be a microphone that converts sound into electrical signals. For example, in the case of the measurement target being a machine tool, if the grease spread on the bearing portions of the machine tool becomes scarce, abnormal noises will occur. By detecting this abnormal noise by a microphone, it is possible to detect abnormalities such as the grease becoming scarce.

An electrical signal generated by the sensor 200 that is a microphone by conversion is outputted to the sensor interface device 100.

It should be noted that, another sensor 200 may be a temperature sensor, or a moisture sensor, or may be a sensor other than these.

The sensor interface device 100 is an interface device connected with the sensor 200. The sensor interface device 100 receives data according to physical quantity measured by the sensors 200 from the sensors 200. The data received from the sensors 200 is as mentioned above, and is an analog vibration waveform signal representing the measured vibrations, for example.

The sensor interface device 100 performs sampling on the data received from the sensor 200. Then, the sensor interface device 100 extracts characteristic data which is data representing the characteristic of sampled data, using a learning model constructed by machine learning with the sampled data as input. In addition, the sensor interface device 100 sends, to the higher-order device 300, the characteristic data extracted using the learning model constructed by machine learning. It should be noted that the specific functional blocks included in the sensor interface device 100, and extraction of characteristic data made using the learning model constructed by the machine learning performed by the sensor interface device 100 will be described later by referencing the drawings of FIG. 2 and later.

The higher-order device 300 receives the characteristic data sent by the sensor interface device 100, and uses the received characteristic data. For example, based on the received characteristic data, some kind of judgment is made, or knowledge is obtained. More specifically, the fact that malfunction or failure has already occurred for the device that is the measurement target is detected, or it is predicted that this malfunction or failure will occur thereafter, for example.

The connection between the sensors 200 and the sensor interface device 100 is realized by a cable or the like for transferring analog signals, for example. On the other hand, the connection between the higher-order device 300 and sensor interface device 100 is realized by LAN (Local Area Network) laid out in the factory, and/or the Internet connecting the factor and a remote location, for example. Such a connection may be a wired connection; however, a part or the entirety thereof may be a wireless connection.

Herein, as also illustrated in FIG. 1, it is configured so that the cycle at which the characteristic data is sent to the higher-order device 300 from the sensor interface device 100 is slower than the cycle at which an analog signal is sent to the sensor interface device 100 from the sensor 200, and this is sampled with the sensor interface device 100. thereby becomes possible to send characteristic data from the sensor interface device 100 to the higher-order device 300 at a low-cycle. For this reason, the effect is exerted in being able to prevent the communication band from being compressed at the communication path between the sensor interface device 100 and higher-order device 300.

In addition, the characteristic data is extracted using the learning model constructed by machine learning from the measurement data obtained by sampling. For this reason, compared to the case of extracting characteristic data by simply a hard-coded method, it also exerts the effect of becoming possible to extract characteristic data more suited to the type, etc. of sensor.

Next, each of the five embodiments for realizing such a measurement information communication system sensor interface device 1000 will be mentioned briefly.

The first embodiment is an embodiment of a basic configuration. In addition, the second embodiment is an embodiment having characteristic with regards to the generation of a timing signal addition to the basic configuration. Furthermore, the third embodiment is an embodiment having a characteristic in the point of connecting a plurality of sensors 200, in addition to the basic configuration. Moreover, the fourth embodiment is an embodiment made by adding a frequency analysis unit, in addition to the basic configuration. Additionally, the fifth embodiment is an embodiment characterized in using an autoencoder, in addition to the basic configuration.

Next, detailed explanations for each of the respective embodiments will be made.

<First Embodiment>

Figure 2:
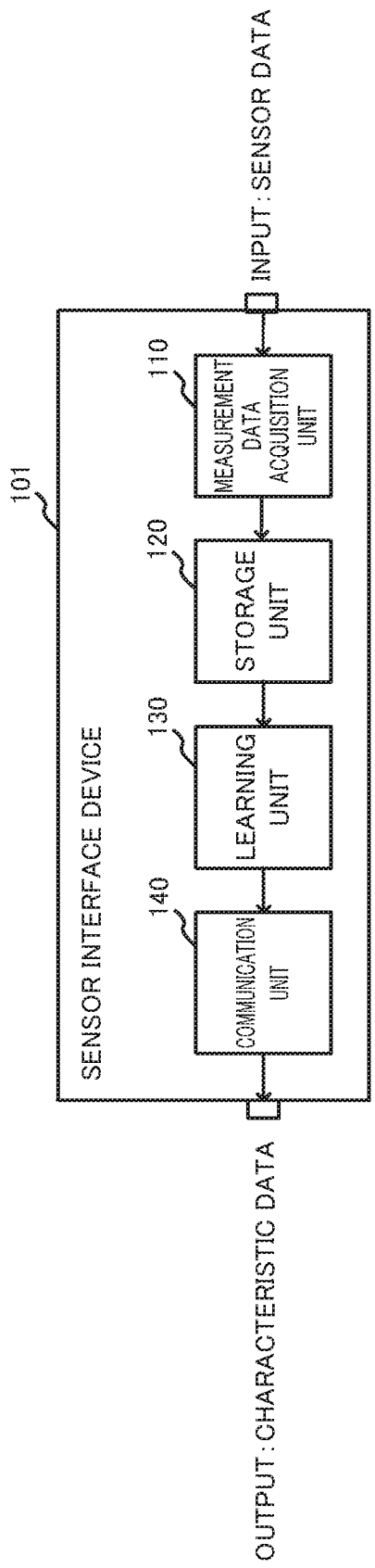
FIG. 2 a block diagram representing a basic configuration of a first embodiment of the present invention.

As shown in FIG. 2, the present invention includes a sensor interface device 101 as a device corresponding to the sensor interface device 100 in FIG. 1. Although illustration is omitted in the drawings, the sensor interface device 101 is connected with the sensor 200 and higher-order device 300 similarly to the sensor interface device 100 shown in FIG. 1. This similarly applies also for a sensor interface device 102, sensor interface device 103a, sensor interface device 103b and sensor interface device 104.

The sensor interface device 101 includes a measurement data acquisition unit 110, storage unit 120, learning unit 130 and communication unit 140.

The measurement data acquisition unit 110 converts an analog signal representing a physical quantity measured by the sensor 200 inputted from the sensor 200 into a digital signal by sampling (generally, an analog voltage or current value) at a predetermined cycle. In the following explanation, an analog signal representing a physical quantity measured by the sensor 200 is called "sensor data" as appropriate. In addition, a digital signal acquired by sampling in this way by the measurement data acquisition unit 110 is called "measurement data" as appropriate hereinafter. The measurement data acquisition unit 110 outputs the measurement data acquired by way of sampling to the storage unit 120.

Herein, the measurement data acquisition unit 110 is realized by a filter for removing noise, etc. from the analog signal, and/or an analog-digital conversion circuit.

In addition, the sampling rate of the measurement data acquisition unit 110 (i.e. sampling cycle) is 100 kHz, for example. In addition, the quantization bit number (i.e. resolving power) of the measurement data acquisition unit 110 is 2 bytes (i.e. 16 bit), for example.

The storage unit 120 is a circuit that functions as a buffer for temporarily storing measurement data outputted by the measurement data acquisition unit 110. The storage unit 120 is realized by DRAM (Dynamic Random Access Memory), for example.

The present embodiment provides the storage unit 120 in order to save a predetermined amount of measurement data acquired by the measurement data acquisition unit 110 following a time series, and then output to the learning unit 130 at a later stage. In this regard, the data temporarily outputted to the learning unit 130 may be overwritten. For this reason, the storage volume of the storage unit 120 is sufficient so long as being the above-mentioned predetermined amount. For example, the predetermined amount may be set as the data amount for 1 second of measurement data. In this case, if the sampling cycle is 100 kHz, and the quantization bit number (i.e. resolving power) is 2 bytes as mentioned above, 200 kbytes will be the above-mentioned predetermined amount, as indicated in "Formula 1" noted below. For this reason, in this case, it is sufficient so long as the storage volume of the storage unit 120 is set to at least 200 kbytes.

$$1[\text{sec}] \times 100000[\text{Hz}] \times 2[\text{byte}] = 200000[\text{byte}] = 200[\text{kbyte}] \qquad (1)$$

It should be noted that the measurement data of this predetermined amount is called "measurement data group" as appropriate hereinafter.

The learning unit 130 is a portion performing machine learning with the measurement data group saved in the storage unit 120 as the input. The learning unit 130 includes an arithmetic processing unit such as a CPU (Central Processing Unit). In addition, the learning unit 130 includes an auxiliary storage device such as NAND-type flash memory storing various programs, and a main storage device such as RAM (Random Access Memory) for storing data which is temporarily necessitated upon the arithmetic processing unit executing programs.

Then, the arithmetic processing unit reads various programs from the auxiliary storage device, and performs arithmetic processing based on these various programs, while expanding the various programs read in the main storage device. In addition, based on this arithmetic processing, a learning model is constructed by performing machine learning, the characteristic data is extracted from this constructed. learning model, and various hardware included by the sensor interface device 101 is controlled. The present embodiment is thereby realized. In other words, the sensor interface 101 can be realized by hardware and software cooperating. It should be noted that, from the viewpoint of hardware and software cooperating, it may be configured so as to realize the sensor interface device 101 by way of FPGA (field-programmable gate array), for example.

Herein, the machine learning performed by the learning unit 130 is assumed as unsupervised learning. Unsupervised learning is a learning method that differs from supervised learning that learns by giving teaching data including input data and a label which is data to be outputted, in that input data is given, but the label is not given. Unsupervised learning models by learning patterns and/or characteristics included in the input data (corresponding to measurement data group in the present embodiment). For example, in order to perform clustering, a learning model is constructed using an algorithm of the k-means method or Ward's method. Then, using the constructed learning model, clustering to automatically classify the provided input. data without external criterion is performed. It is thereby possible to perform detection of malfunction and/or failure, for example. In addition, by continuing machine learning using this learning model on a temporarily constructed learning model, it is possible to further raise the accuracy of the learning model.

When explained in further detail, if the case of detection of the malfunction and/or failure of a machine tool, by continuing machine learning with the measurement data group as the input, the probability distribution of values for respective measurement data is estimated. Then, using the estimated probability distribution, it derives the event probability of measurement data newly inputted. Then, if the derived event probability is no more than a constant, since the behavior of the machine tool will differ from normal behavior, it is determined that an abnormality is occurring. In other words, since the behavior of the machine tool differs from normal behavior, it is possible to detect that malfunction or failure is occurring in the machine tool, or there is an indication that malfunction or failure will occur.

As a method of abnormality detection based on such an estimation of probability distribution, for example, outlier detection can be exemplified. In outlier detection, using the estimated probability distribution, unusual items having a value greatly departing from an estimation data group targeted by machine learning in the past are detected. For example, in the case of the amplitude value of vibration being a large value that is deviating far from normal, since the behavior of the machine tool differs from normal behavior, it is possible to detect that malfunction or failure is occurring in the machine tool, or there is an indication that malfunction or failure will occur.

The learning unit 130 of the present embodiment estimates the probability distribution of values of respective measurement data by continuing machine learning as mentioned above. In addition, using the estimated probability distribution, the event probability of measurement data newly inputted is derived. Then, the event probability derived in this way is inputted to the communication unit 140 as an output result.

The communication unit 140 is a network interface for realizing communication between the sensor interface device 100 and the higher-order device 300. The output result of machine learning by the learning unit 130 inputted to the communication unit 140 is sent from the communication unit 140 to the higher-order device 300. The point of this cycle of sending being slower than the cycle at which the sensor data is sent from the sensor 200 to the sensor interface device 100, and this is sampled with the sensor interface device 100 is as mentioned above.

The higher-order device 300 can detect that malfunction or failure is occurring in the machine tool, or there is an indication that malfunction or failure will occur, by performing the outlier detection or the like as mentioned above, using the received event probability.

It should be noted that the learning unit 130 performing machining learning in this way is merely one example ultimately. The learning unit 130 may perform machine learning using another method in order to output characteristic data representing the characteristic of the measurement data group. In addition, it may be configured so that the learning unit 130 does not send the event probability derived by itself to the higher-order device 300, but rather the learning unit 130 performs outlier detection, etc. using the event probability derived by itself, and sends the result of this outlier detection to the higher-order device 300.

Figure 3:
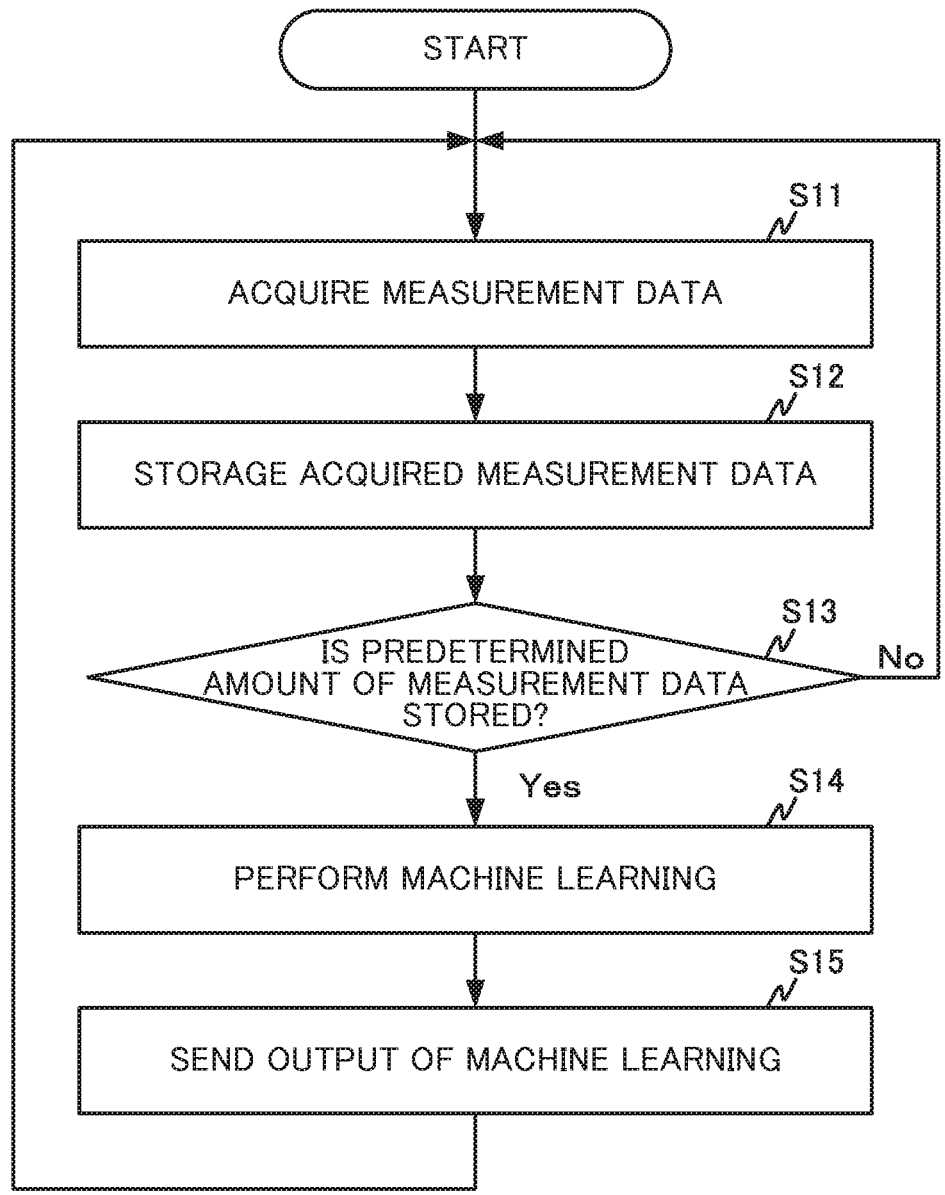
FIG. 3 is a flowchart representing basic operation movements of the first embodiment of the present invention.

Next, an explanation for the operations of the present embodiment will be made by referencing the flowchart of FIG. 3. First, the measurement data acquisition unit 110 acquires the measurement data by performing sampling at a predetermined. cycle (Step S11).

Next, the storage unit 120 stores the measurement data acquired in Step S11 (Step S12). Next, it is determined if a predetermined amount of measurement data is stored in the storage unit 120, i.e. a predetermined amount of measurement data has accumulated (Step S13). Herein, predetermined amount is the measurement data for 1 second, for example, as mentioned above.

If not stored in the predetermined amount (NO in Step S13), Step S11 and Step S12 are repeated.

On the other hand, if stored in the predetermined amount (YES in Step S13), the processing advances to Step S14.

Then, the learning unit 130 performs machine learning using the measurement data group, which is the measurement data of the predetermined amount stored (Step S14).

Then, the output of machine learning is sent to the higher-order device 300 by the communication unit 140 (Step S15). Subsequently, the processing returns to Step S11 and is repeated. It should be noted that, in parallel with performing Step S14 and Step S15, it may be configured to perform. Steps S11 to S13 for the next cycle of processing. In addition, after completion of Step S15, it may be configured so as to start the processing from. Step S11 again after a predetermined time elapses. In other words, it may be configured so as to perform processing by providing a predetermined interval.

With the present embodiment, it thereby becomes possible to send characteristic data from the sensor interface device 100 to the higher-order device 300 at a low-cycle. For this reason, the present embodiment exerts an effect in being able to prevent the communication band from being compressed at the communication path between the sensor interface device 100 and higher-order device 300. In addition, the effect is exerted of the load on the higher-order device 300 which is the receiving side reducing.

It is possible to prevent compression of the communication band at the communication path between the sensor interface device 100 and higher-order device 300. In contrast, with the communication path between the sensor interface device 100 and sensors 200, communication similar to conventional is performed. For this reason, upon implementing the present embodiment, it is good to connect the sensor interface device 100 as close to the sensors 200 as possible.

In addition, with the present embodiment, characteristic data is extracted using the learning model constructed by performing machine learning on the measurement data obtained by sampling. For this reason, the present embodiment also exerts the effect of making possible to extract characteristic data more suited to the type, etc. of sensor, compared to a case of extracting characteristic data by simply a hard-coded method.

Furthermore, in the present embodiment, it is unnecessary to perform machine learning in the higher-order device 300 due to performing machine learning in the sensor interface device 100. For this reason, the effect is also exerted in making possible to add the function of machining at low cost also to a legacy higher-order device 300 for which it is difficult to newly add the function of machine learning.

Furthermore, with the present embodiment, it is unnecessary to attach a label to the input data and create teaching data, due to applying unsupervised learning. For this reason, an effect is also exerting in being able to eliminate human labor, etc. for creating teaching data.

<Second Embodiment>

Figure 4:
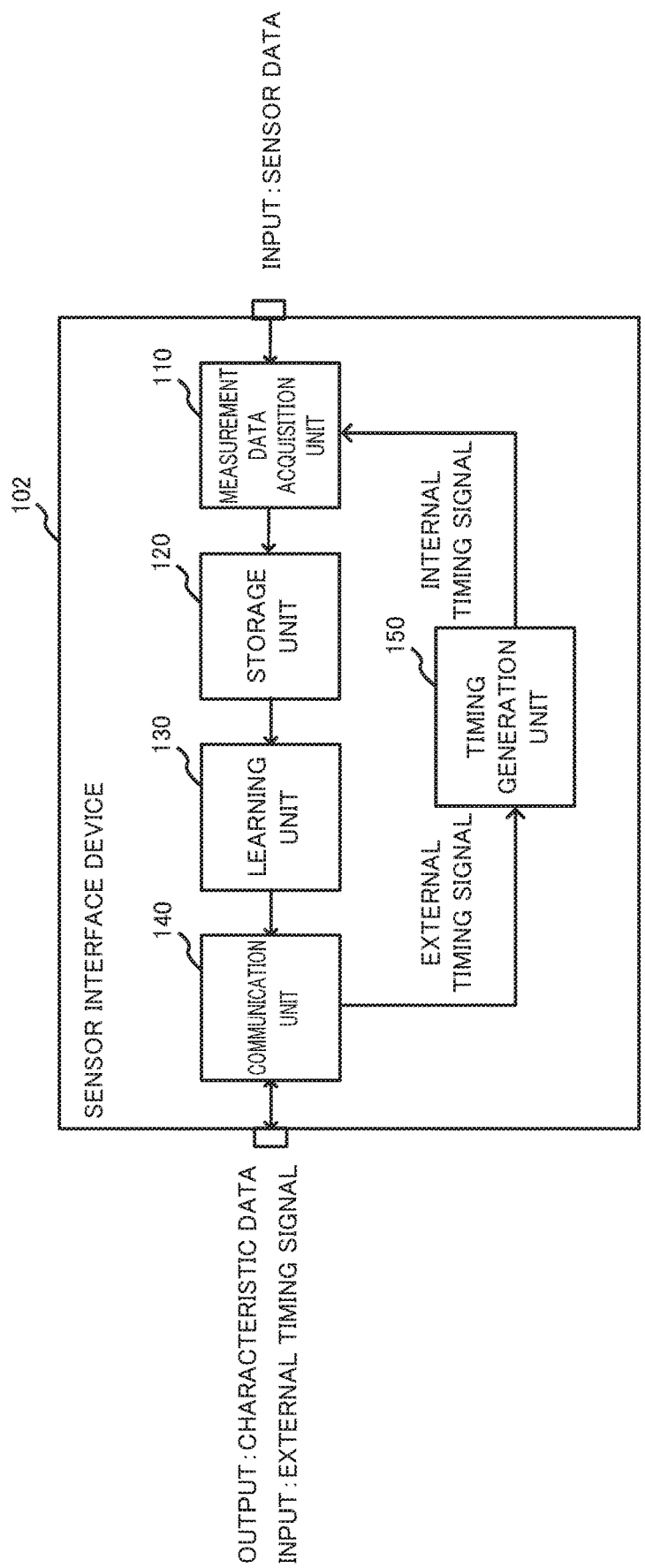
FIG. 4 is a block diagram representing a basic configuration of a second embodiment of the present invention.

Next, an explanation will be made for a second embodiment by referencing FIGS. 4 and 5. It should be noted that, although similar for the explanations of the third to fifth embodiments described later, explanations for configurations and functions shared with the first embodiment will be omitted, and unique points in each embodiment will be explained in detail.

The sensor interface device 102 of the present embodiment further includes a timing generation unit 105, in addition to the configurations of the sensor interface device 101 of the first embodiment. The timing generation unit 150 is a portion for multiplying the frequency, and is realized by a PLL (Phase locked loop), which is a phase synchronization circuit, for example. In the present embodiment, an external timing signal sent by the higher-order device 300 is received at the communication unit 140. Then, by using this external timing signal, communication that is synchronized between the higher-order device 300 and sensor interface device 100 is realized. It should be noted that the external timing signal is a demand signal for characteristic data being sent at a predetermined cycle from the higher-order device 300, for example.

Herein, as mentioned above, the present embodiment configures so that the cycle at which the sensor interface device 102 performs sampling on the sensor data that is an analog waveform signal received from the sensor 200 is faster than the cycle at which the sensor interface device 102 sends characteristic data to the higher-order device 300. For this reason, as shown in FIG. 5, the external timing signal received by the communication unit 140 is multiplied by a multiplier n (n is any natural number) by the timing generation unit 150 to generate an internal timing signal. Then, the generated internal timing signal is outputted to the measurement data acquisition unit 110.

Figure 5:
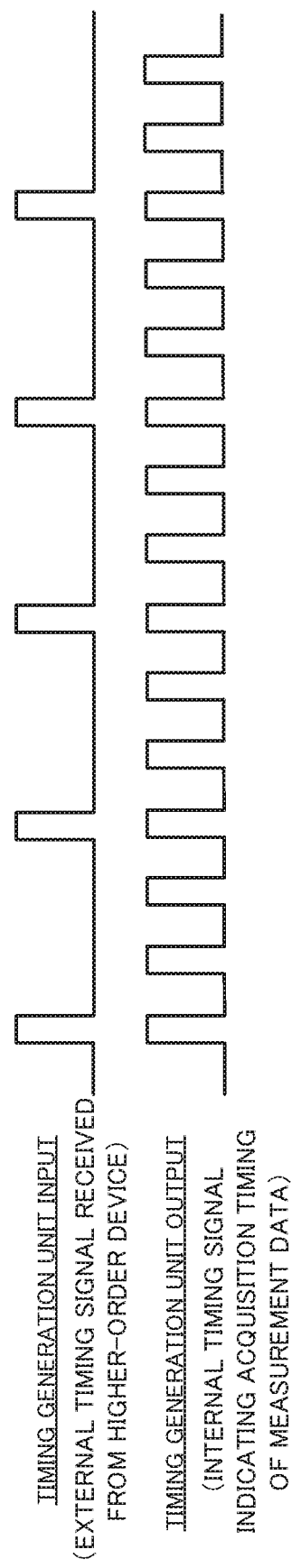
FIG. 5 is a view showing I/O information of a timing generation unit of the second embodiment of the present invention.

It should be noted that FIG. 5 is a view illustrated for simplifying explanation, and multiplies with n=3 as an example. However, it may be configured so as to further increase the value of n as the actual numerical value. More specifically, since the external timing signal is received at a 1-msec cycle, for example, it may be configured so as to multiply this a multiplier of 100 with n=100, for example, by the timing generation unit 150 to generate an internal timing signal of a 10-μsec cycle.

The measurement data acquisition unit 110 acquires the measurement data by sampling at a timing based on this internal timing signal. The sensor interface device 102 can thereby output the results of machine learning using n number of measurement data sets to the higher-order device 300 while synchronizing with the higher-order device 300.

<Third Embodiment>

Next, an explanation will be made for a third embodiment by referencing FIGS. 6 and 7. The present embodiment connects with a plurality of the sensors 200. Therefore, a plurality of the measurement data acquisition units 110 is provided so as to be able to correspond to each of the sensors 200, and output to the storage unit 120 is performed in parallel, as in the sensor interface device 103*a* shown in FIG. 6. In addition, by using a channel selection signal, output of the measurement data acquired from each of the sensors 200 to the storage unit 120 is performed in series by time sharing, as in the sensor interface device 103*b* shown in FIG. 7. It should be noted that m and k in the drawings are both any natural number.

Although being a reason for using for a plurality of the sensors 200 in this way, this is because there is a possibility of there being a case of detection of abnormality, etc. not being possible, when performing machine learning based on only a physical quantity measured by one sensor 200. For example, there are cases such that an abnormality that cannot be detected based on simply vibration in the X axis can be detected if basing on both vibration in the X axis and vibration in the Y axis, or the like. As it were, there are cases such that there is a correlation with the physical quantities measured by a plurality of the sensors 200. Taking consideration of such cases, the present embodiment configures so as to use a plurality of the sensors 200. The plurality of the sensors 200 may be the same sensors 200 arranged at different locations, or may be a combination of different types of the sensors 200.

Figure 6:
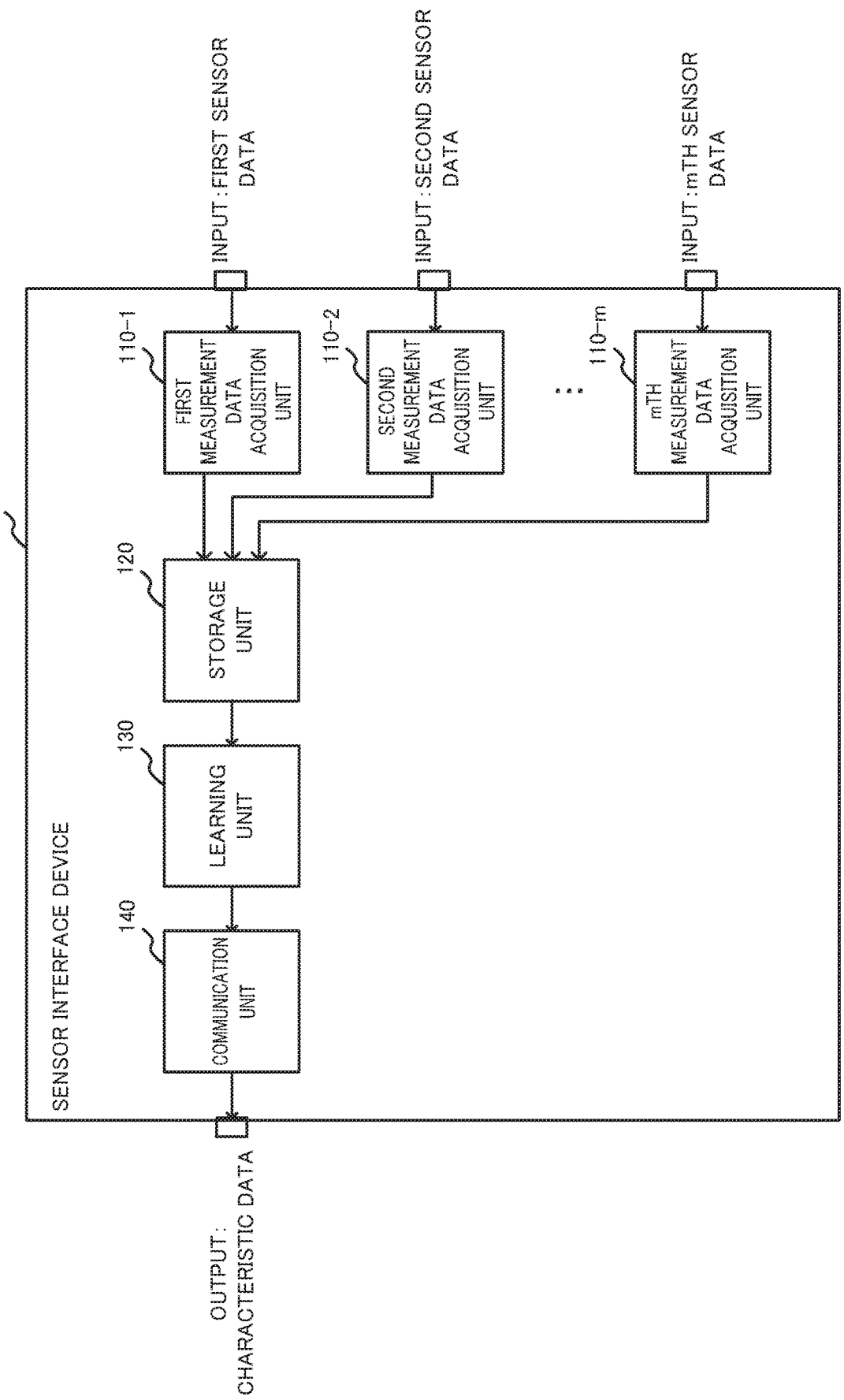
FIG. 6 is a block diagram representing a basic configuration of a third embodiment of the present invention.

With the sensor interface device 103*a* shown in FIG. 6, each of the measurement data acquisition units 110 receives sensor 200 data from respectively different sensors 200, and each acquires measurement data by performing sampling. The acquired measurement data is stored in the storage unit 120. In this case, it is good to configure so that regions are logically divided in the storage unit 120 so as to correspond to each of the measurement data acquisition units 110. Then, it is good to configure so that each of the measurement data acquisition units 100 stores measurement data in a region corresponding to itself. In addition, it may be configured so as to physically provide a plurality of storage units 120, rather than logically divide regions. Then, it is good to configure so that the learning unit 130 performs machine learning with the measurement data group including the measurement data sampled by each of the measurement data acquisition units 110 as the input.

Figure 7:
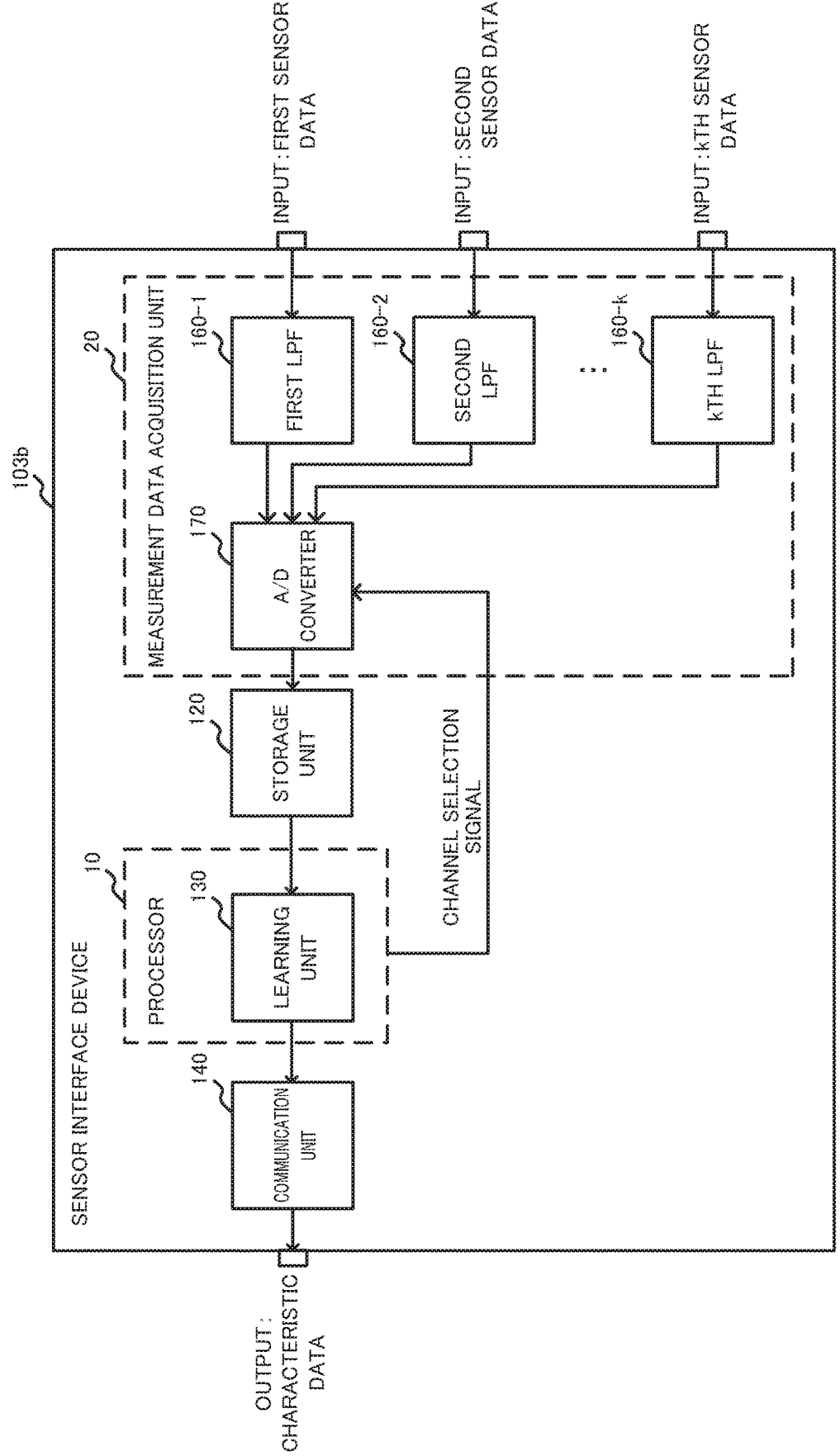
FIG. 7 is a block diagram representing a basic configuration of a modified example of the third embodiment of the present, invention.

The sensor interface device 103*b* shown in FIG. 7 is an example made by modifying the aforementioned sensor interface device 103*a*. As mentioned above, the measurement data acquisition unit 110 includes inside an analog-digital conversion circuit (in the following explanation, referred to as "A/D converter 170" as appropriate) for sampling digital values from an analog signal. However, the A/D converter 170 is a relatively high-cost circuit element. For this reason, one A/D converter 170 is shared by a plurality of channels corresponding to the inputs from a plurality of sensors 200, as shown in FIG. 7. It is thereby possible to curb the number of A/D converters 170 to one, whereby it becomes possible to realize the present embodiment at low cost.

Two methods have been considered as implementation methods. First, one method is a method using an A/D converter 170IC. having input pins of a plurality of channels. In this case, switching between input channels can be performed within IC.

In addition, the other method is a method that arranges a channel switching circuit outside of the A/D converter 170IC, and performs channel switching by this channel switching circuit. In this case, for example, channel switching is performed outside of the A/D converter 170IC using an analog multiplexer as the channel switching circuit.

The prior method is shown in FIG. 7 It should be noted that it may be configured so that a low-cost circuit element is realized by every channel. For example, a low pass filter (LPF) inserted for noise cancellation is a relatively low-cost circuit element. For this reason, it is good to insert for each of the plurality of channels corresponding to inputs from the plurality of sensors 200, as illustrated in FIG. 7 as LPF 160.

It should be noted that the processor 10 consisting of a CPU, etc. for realizing the learning unit 130 outputs the channel selection signal in either implementation method. Then, the A/D converter 170IC or channel switching circuit inputs the channel selection signal from the processor 10, and selects the input channel based on this channel selection signal. It thereby becomes possible for the sensor interface device 103*b* to use one A/D converter 170 by time sharing between a plurality of channels.

According to the present embodiment, it is possible to perform machine learning using physical quantities that are thought to have a correlation measured by each of the plurality of sensors 200. In addition, so long as establishing a configuration such as that of the sensor interface device 103*b*, it will be possible to set the number of A/D converters 170 which are relatively high-cost circuit elements to one.

<Fourth Embodiment>

Figure 8:
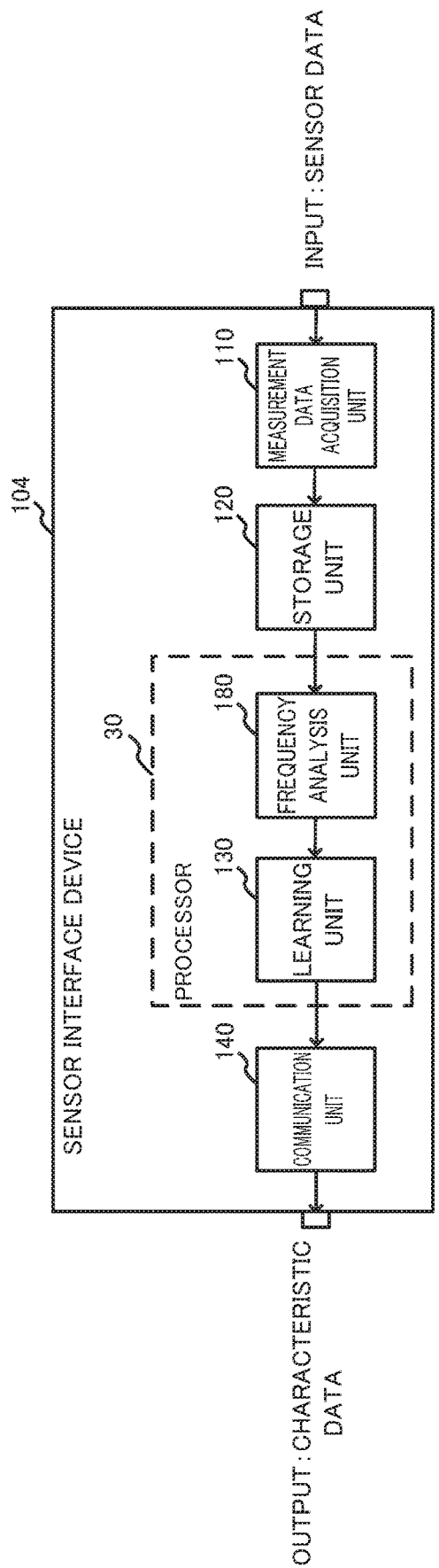
FIG. 8 is a block diagram representing a basic configuration of a fourth embodiment of the present invention.

Next, an explanation is made for a fourth embodiment by referencing FIG. 8. The sensor interface device 104 of the present embodiment further adds a frequency analysis unit

180. The frequency analysis unit 180 extracts a frequency spectrum by performing Fourier transformation on a measurement data group stored in the storage unit 120. Then, the learning unit 130 extracts characteristic data by performing machine learning using this frequency spectrum.

The frequency analysis unit 180 can be realized by the processor 30 consisting of a CPU, etc. for realizing the learning unit 130, and a program for performing frequency analysis. However, it may be configured so as to realize the frequency analysis unit 180 by hardware such as a dedicated circuit.

The present embodiment extracts the frequency spectrum by performing Fourier transformation as pre-processing of machine learning in this way, and then performs machine learning. Although depending on the type, etc. of physical quantity measured by the sensor, it thereby becomes possible to perform efficient machine learning. It should be noted that it is also possible to truncate a predetermined band of the frequency spectrum (e.g., band of frequency higher than predetermined value, band of frequency lower than predetermined value), and then perform machine learning. However, in the case of being unclear which band represents the characteristic of measurement data, it is good to configure so as to execute machine learning with all bands as input without performing such processing, and to entrust determination according to machine learning.

<Fifth Embodiment>

Next, an explanation will be made for a fifth embodiment by, referencing FIG. 9. The present embodiment establishes the learning unit 130 included in all of the aforementioned embodiments as a learning unit 40 including an autoencoder. It should be noted that an autoencoder is well known, and can be realized by employing the technology described in the following publication (referred to as "Non-Patent Document 1"), for example.

Non-Patent Document 1: G. E. Hinton and R. R. Salakhutdinov; "Reducing the Dimensionality of Data with Neural Networks," [online], SCIENCE 2006 Jul. 28 (searched on 2016 Nov. 1), Internet <URL: https://www.cs.toronto.edu/~hinton/science.pdf>

Figure 9:
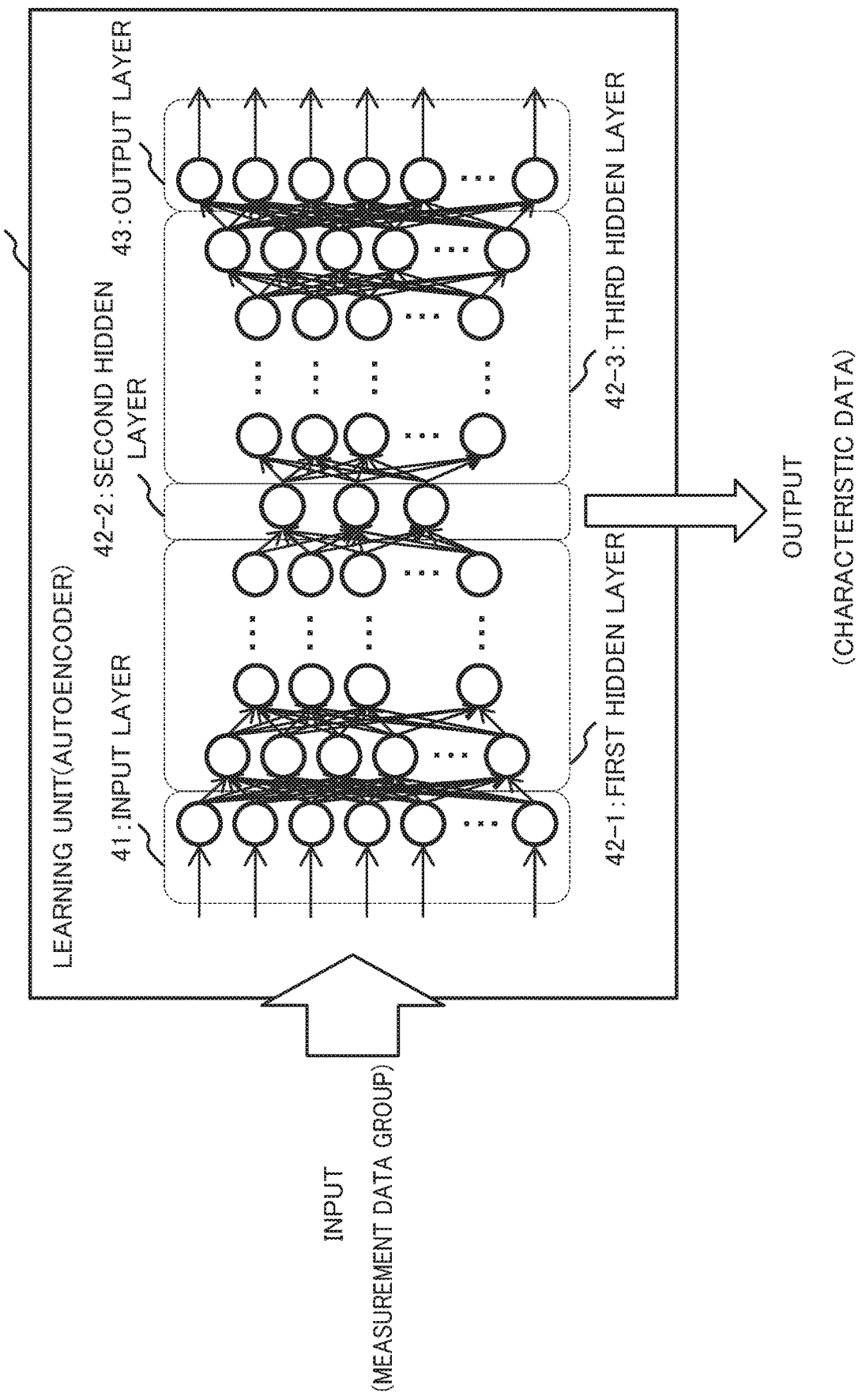
FIG. 9 is a block diagram representing a basic configuration of a fifth embodiment of the present invention.

FIG. 9 shows the learning unit 40 which is a characteristic of the present embodiment. The learning unit 40 is realized by a neural network including perceptrons for realizing an input layer 41, hidden layer 42, and output layer 43, as shown in FIG. 9.

The dimension numbers of the input layer 41 and output layer 43 are set as the same number. Then, it is configured so that the dimension number decreases as the layers progress at the first hidden layer 42-1. Then, it is configured so that the dimension number becomes the smallest at the second hidden layer 42-2. In addition, it is configured so that the dimension number increases as the layers progress at the third hidden layer 42-3. Then, the dimension numbers of the input layer 41 and output layer 43 become the same number as mentioned above.

Then, the learning unit 40 inputs the measurement data group inputted from the storage unit 120 to the input layer 41 as input data. Then, machine learning is performed by configuring so as to change the weighting of each layer so that the output data outputted from the output layer 43 by passing through the hidden layer 42 becomes the same as the input data.

As a result, the output of the second hidden layer 42-2 becomes data indicating the characteristic of the measurement data group that is the input data well with little data volume. Therefore, the learning unit 40 outputs to the communication unit 140 with the output of the second hidden layer 42-2 as characteristic data, rather than the output of the output layer 43. Then, the communication unit 140 sends this characteristic data to the higher-order device 300.

The higher-order device 300 performs prediction, etc. related to the occurrence of malfunction and/or failure, for example, using this characteristic data. In this case, for example, the clustering method is used. More specifically, the characteristic data for a case of the device that is the measurement object is operating normally is saved, and a distribution of this characteristic data when normal is created. For example, it is regarded that the device running for about a year is properly operating, and the distribution of characteristic data when normal is created from this one year of characteristic data.

Then, classification (i.e. clustering) is subsequently made as to whether new characteristic data is either data deviating from this distribution, or is data not deviating. It should be noted that, rather than classifying into two in this way, it may be configured so as to be more finely clustered. according to the degree of deviating from the distribution.

In addition, based on the results of this clustering, it is determined whether an abnormality occurred in the device that is the measurement target. For example, based on the results of this clustering, it is possible to determine that an abnormality is occurring in the case of a certain number of data points deviating far from the distribution being present and occurring continuously for a certain time, and that malfunction and/or failure is occurring in the device that is the measurement target.

According to the present embodiment explained above, it becomes possible to further decrease the data volume sent from the sensor interface device 100 to the higher-order device 300 by using an autoenconder.

Explanations have been made for five embodiments above. It is possible for each of these embodiments to be combined. For example, it is possible to add the frequency analysis unit 180 of the fourth embodiment at a stage before the learning unit 130 in any of the embodiments among the first embodiment, second embodiment and third embodiment.

In addition, the aforementioned embodiments are preferred embodiments of the present invention; however, they are not to limit the scope of the present invention only to the above-mentioned embodiments, and it is possible to implement in forms produced by conducting various modifications in a scope not departing from the gist of the present invention.

For example, the aforementioned higher-order device 300 and sensor interface device 100 may be built into a numerical control device, or be realized by the numerical control device, for example. In addition, this numerical control device may be a numerical control device that controls a machine tool that is the measurement target by the sensor 200.

Moreover, it may be configured so as to improve the precision of the learning model, by further performing supervised learning, semi-supervised learning, and reinforcement learning, on the learning model constructed by unsupervised learning as mentioned above by the learning unit 130.

It should be noted that the above-mentioned sensor interface device and higher-order device can be realized by hardware, software or a combination of these. In addition, the measurement information communication method performed by the above-mentioned sensor interface device and/or higher-order device can be realized by hardware, software or a combination of these. Herein, being realized by software indicates being realized by a computer reading out and executing programs.

The programs can be stored using various types of non-transitory computer readable media, and supplied to a computer. The non-transitory computer readable medium includes various types of tangible storage media. Examples of non-transitory computer readable media include magnetic media (for example, flexible disk, magnetic tape, hard disk drive), magneto-optical recording media (for example, magneto-optical disk), CD-ROM (Read Only Memory), CD-R, CD-R/W, and semiconductor memory (for example, mask ROM, PROM (Programmable ROM), EPROM (Erasable PROM), flash ROM, RAM (Random Access Memory)). In addition, the programs may be provided to a computer by way of various types of transitory computer readable media. Examples of transitory computer readable media include electrical signals, optical signals and electromagnetic waves. The transitory computer readable media can provide programs to a computer via a wired communication path such as electrical wires and optical fibers, or a wireless communication path.

EXPLANATION OF REFERENCE NUMERALS 10, 30 processor
20 measurement data acquisition unit
40 learning unit (autoencoder)
41 input layer
42-1 first hidden layer
42-2 second hidden layer
42-3 third hidden layer
43 output layer
100, 101, 102, 103a, 103b, 104 sensor interface device
110 measurement data acquisition unit
120 storage unit
130 learning unit
140 communication unit
150 timing generation unit
160 LPF
170 A/D converter
180 frequency analysis unit
200 sensor
300 higher-order device
1000 measurement information communication system.

What is claimed is:

1. A sensor interface device comprising:
a data acquisition circuit configured to acquire measurement data, which is data based on a physical quantity measured by a measurement device;
a sensor interface memory configured to store the measurement data acquired;
a machine learning central processing unit (CPU) configured to execute a computer-executable program stored on a computer-readable recording medium and perform machine learning by unsupervised machine learning using a k-means method or Ward's method with a measurement data group stored as an input, thereby extracting of characteristic data, which is data representing a characteristic of the measurement data group; and
a network interface configured to send the characteristic data extracted by the machine learning to a device which has a higher-order than a sensor interface,
wherein the sensor interface device is connected in a communication path between the measurement device and the device which has the higher-order than the sensor interface, and
when a communication path between the sensor interface device and the measurement device is defined as a first communication path and a communication path between the sensor interface device and the device which has the higher-order than the sensor interface is defined as a second communication path, the network interface is configured to send the characteristic data via the second communication path to the device which has the higher-order than the sensor interface at a slower cycle than a cycle at which the data acquisition circuit acquires the measurement data via the first communication path.

2. The sensor interface device according to claim 1, wherein the machining learning CPU executes the computer-executable program and constructs a learning model by repeatedly performing the machine learning while varying the measurement data group inputted, and performs extraction of the characteristic data from a new measurement data group using the learning model constructed.

3. The sensor interface device according to claim 1, wherein the data acquisition circuit acquires measurement data based on a physical quantity measured in respectively different measurements.

4. The sensor interface device according to claim 1, wherein the data acquisition circuit includes one analog-digital conversion circuit for acquiring the measurement data by sampling an analog signal representing a physical quantity measured in the measurements, and the data acquisition circuit acquires the measurement data using the one analog-digital conversion circuit by time sharing for each analog signal representing a physical quantity measured by a plurality of the measurements.

5. The sensor interface device according to claim 1, wherein the sensor interface device further performs Fourier transformation on a measurement data group stored, and
the machine learning CPU executes the computer-readable program and performs machine learning with the measurement data group subjected to the Fourier transformation as an input, thereby performing extraction of the characteristic data.

6. The sensor interface device according to claim 1, wherein the sensor interface device utilizes an autoencoder in extraction of the characteristic data.

7. A sensor interface device comprising:
a data acquisition circuit configured to acquire measurement data, which is data based on a physical quantity measured by a measurement device;
a sensor interface memory configured to store the measurement data acquired;
a machine learning central processing unit (CPU) configured to execute a computer-executable program stored on a computer-readable recording medium and perform machine learning by unsupervised machine learning using a k-means method or Ward's method with a measurement data group stored as an input, thereby extracting of characteristic data, which is data representing a characteristic of the measurement data group;
a network interface configured to send the characteristic data extracted by the machine learning to a device which has a higher-order than the sensor interface; and
a timing generation circuit configured to generate an internal timing signal, by multiplying an external timing signal periodically received from the device which has the higher-order than the sensor interface,
wherein the sensor interface device is connected in a communication path between the measurement device and the device which has the higher-order than the sensor interface, and
the data acquisition circuit is configured to acquire the measurement data at a timing based on the internal timing signal.

8. A measurement information communication system comprising, a sensor interface device comprising:
a data acquisition circuit configured to acquire measurement data, which is data based on a physical quantity measured by a measurement device;
a sensor interface memory configured to store the measurement data acquired;
a machine learning central processing unit (CPU) configured to execute a computer-executable program stored on a computer-readable recording medium and perform machine learning by unsupervised machine learning using a k-means method or Ward's method with a measurement data group stored as an input, thereby extracting of characteristic data, which is data representing a characteristic of the measurement data group; and
a network interface configured to send the characteristic data extracted by the machine learning to a device which has a higher-order than a sensor interface,
wherein the sensor interface device is connected in a communication path between the measurement device and the device which has the higher-order than the sensor interface, and
when a communication path between the sensor interface device and the measurement device is defined as a first communication path and a communication path between the sensor interface device and the device which has the higher-order than the sensor interface is defined as a second communication path, the network interface is configured to send the characteristic data via the second communication path to the device which has the higher-order than the sensor interface at a slower cycle than a cycle at which the data acquisition circuit acquires the measurement data via the first communication path; and
the device which has the higher-order than the sensor interface,
wherein the physical quantity measured is a physical quantity related to a measurement target device, and
wherein the device which has the higher-order than the sensor interface performs prediction related to an occurrence of a malfunction or a failure of the measurement target device based on the characteristic data.

9. A measurement information communication method executed by a sensor interface device comprising:
acquiring, using a data acquisition circuit, measurement data which is data based on a physical quantity measured by a measurement device;
storing, using a sensor interface memory, the measurement data acquired;
performing, using a machine learning central processing unit (CPU), machine learning by unsupervised machine learning using a k-means method or Ward's method with a measurement data group stored as an input, thereby performing extraction of characteristic data, which is data representing a characteristic of the measurement data group; and
sending, using a network interface, the characteristic data extracted in the machine learning to a device which has a higher-order than a sensor interface,
when a communication path between the sensor interface device and the measurement device is defined as a first communication path and a communication path between the sensor interface device and the device which has the higher-order than the sensor interface is defined as a second communication path, the network interface is configured to send the characteristic data via the second communication path to the device which has the higher-order than the sensor interface at a slower cycle than a cycle at which the data acquisition circuit acquires the measurement data via the first communication path.

10. A measurement information communication method executed by a sensor interface device comprising:
acquiring, using a data acquisition circuit, measurement data which is data based on a physical quantity measured by a measurement device;
storing, using a sensor interface memory, the measurement data acquired;
performing, using a machine learning central processing unit (CPU), machine learning by unsupervised machine learning using a k-means method or Ward's method with a measurement data group stored as an input, thereby performing extraction of characteristic data, which is data representing a characteristic of the measurement data group;
sending, using a network interface, the characteristic data extracted in the machine learning to a device which has a higher-order than a sensor interface; and
generating, using a timing generation circuit, an internal timing signal, by multiplying an external timing signal periodically received from the device which has the higher-order than the sensor interface,
wherein the measurement data is acquired at a timing based on the internal timing signal.

11. A non-transitory computer readable medium encoded with a measurement information communication program for enabling a processor connected in a communication path between a measurement device and a device which has a higher-order than a sensor interface to function as a sensor interface device, the measurement information communication program being executed by the processor to perform operations comprising:
acquiring measurement data, which is data based on a physical quantity measured by the measurement device;
storing the measurement data acquired;
performing machine learning by unsupervised machine learning using a k-means method or Ward's method with a measurement data group stored as an input, thereby extracting of characteristic data, which is data representing a characteristic of the measurement data group; and
sending the characteristic data extracted by the machine learning to the device which has the higher-order than the sensor interface,
wherein when a communication path between the sensor interface device and the measurement device is defined as a first communication path and a communication path between the sensor interface device and the device which has the higher-order than the sensor interface is defined as a second communication path, the characteristic data is sent via the second communication path to the device which has the higher-order than the sensor interface at a slower cycle than a cycle at which the measurement data is acquired via the first communication path.

12. A non-transitory computer readable medium encoded with a measurement information communication program for enabling a processor connected in a communication path between a measurement device and a device which has a higher-order than a sensor interface to function as a sensor interface device, the measurement information communication program being executed by the processor to perform operations comprising:

acquiring measurement data, which is data based on a physical quantity measured by the measurement device;

storing the measurement data acquired;

performing machine by unsupervised machine learning using a k-means method or Ward's method learning with a measurement data group stored as an input, thereby extracting of characteristic data, which is data representing a characteristic of the measurement data group, sending the characteristic data extracted by the machine learning to the device which has the higher-order than the sensor interface; and generating an internal timing signal, by multiplying an external timing signal periodically received from the device which has the higher-order than the sensor interface, wherein the sensor interface device is connected in a communication path between the measurement device and the device which has the higher-order than the sensor interface, and the measurement data is acquired at a timing based on the internal timing signal.

* * * * *